INVENTORS
WILLIAM M. KAHN
JOHN E. MEKOTA, JR.
BY
ATTORNEY

INVENTOR.
WILLIAM M. KAHN
JOHN E. MEKOTA, JR.
BY Henry L. Hanson
ATTORNEY

INVENTORS
WILLIAM M. KAHN
JOHN E. MEKOTA, JR.
BY Henry L. Hanson
ATTORNEY

Oct. 26, 1965 W. M. KAHN ETAL 3,214,737

DATA PROCESSING APPARATUS

Filed Jan. 11, 1960 7 Sheets-Sheet 4

INVENTOR.
WILLIAM M. KAHN
JOHN E. MEKOTA, JR.

BY [signature]

ATTORNEY

Oct. 26, 1965 W. M. KAHN ETAL 3,214,737

DATA PROCESSING APPARATUS

Filed Jan. 11, 1960 7 Sheets-Sheet 5

INVENTOR.
WILLIAM M. KAHN
JOHN E. MEKOTA, JR.

BY Henry L. Hanson

ATTORNEY

INVENTOR.
WILLIAM M. KAHN
JOHN E. MEKOTA, JR.
BY
ATTORNEY

INVENTOR.
WILLIAM M. KAHN
JOHN E. MEKOTA, JR.
BY
ATTORNEY

United States Patent Office 3,214,737

Patented Oct. 26, 1965

3,214,737

DATA PROCESSING APPARATUS

William M. Kahn, Brighton, and John E. Mekota, Jr., Belmont, Mass., assignors to Honeywell Inc., a corporation of Delaware Filed Jan. 11, 1960, Ser. No. 1,555
15 Claims. (Cl. 340—172.5)

A general object of the present invention is to provide a new and improved apparatus useful in the controlling of an electronic data processing system. More specifically, the present invention is concerned with a new and improved control unit for a data processing system wherein the control unit is capable of providing the necessary control signals for a multi-programmed data processing system.

In order to utilize an electronic data processing system in the most efficient manner, it has been found that a system may well be organized so that a plurality of separate and distinct programs can be carried out at essentially the same time by the system. This may be accomplished by an appropriate time-sharing of the central portion of the system under control of what has been termed a traffic control circuit. Each program to be performed may be represented within the control system by way of a control line having a signal thereon which is adapted to be periodically scanned by control circuitry such that the control lines having active signals thereon will be sensed in sequence to in turn produce the essential control signals for the rest of the data processing system.

Under certain programming conditions in a multi-programmed system, it is possible to have a program operation where two or more programs may be calling for a particular data processing equipment at the same time. It is also possible for the orders in a particular program to call for a particular control equipment or device in a time sequence such that the control action initiated by one order will not be completed prior to the time that a second order calls for said equipment or device. Under these conditons, it is necessary that there be provided means for recognizing the fact that a particular device or equipment is busy, to further recognize which program is calling for the particular device or equipment involved, and to stop that program momentarily. Once a particular program has been interrupted due to the fact that a particular item of equipment is busy, it is essential that, as soon as the busy condition is removed, steps be taken to put the control circuitry back to a position where it can perform the order which was held up. In order to prevent any one program from taking more than its share of the amount of time available, steps are taken to provide for storing data to identify which program is turned off first. Once the appropriate data has been stored, it is possible to continue on in the normal data processing manner with other programs until the busy condition is removed, at which time the stored data may be utilized to initiate a further operation directly related to the program which was temporarily interrupted.

It is accordingly a further more specific object of the present invention to provide a new and improved data processor having a multi-program facility wherein means are provided for storing data uniquely representing a program which has been temporarily turned off due to a preselected control indication within the system.

Still another more specific object of the present invention is to provide a multi-programmed control system having facilities for remembering which program of a plurality may be turned off first due to a busy condition within the system, and means for reinstating the program operation for the program which has been turned off, as soon as the busy condition has been removed.

In an apparatus of the present type utilizing a traffic control circuit for time sequencing or sharing in the system, it is essential that the traffic control itself operate in a very efficient manner by rapidly seeking out those programs having an active demand signal line calling for a predetermined program operation, and once an active signal line is found, appropriate data may then be stored and the traffic control released so that it may seek out a further active demand line.

A further object of the invention is therefore to provide a new and improved sequence register control circuit for a multi-programmed data processing system wherein the traffic control seeks out, in a predetermined sequence, the active program signal lines and, once a line has been sensed to be active, the data associated with identifying that line will be stored and the traffic control circuit will be released for further searching on another active signal line.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
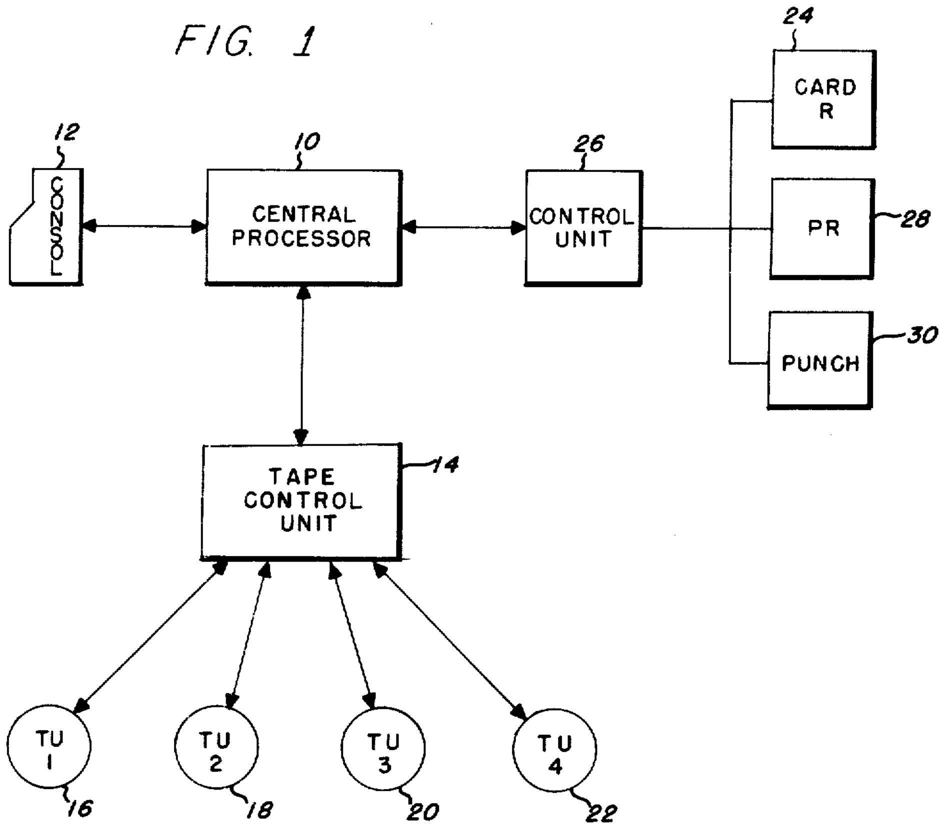
FIGURE 1 illustrates diagrammatically the arrangement of a typical data processing system.

Referring to FIGURE 1, the numeral 10 identifies a central processor of a data processing system which may well incorporate the features of the present invention. Communicating with and in control of the central processor is a console 12, which is a means by which an operator may communicate with the central processor 10. The central processor 10 also communicates by way of a tape control unit 14 with a plurality of bulk storage devices which may take the form of tape units 16, 18, 20 and 22. Data may be fed into the central processor by way of a card reader 24 and a control unit 26. In addition, data from the central processor may be transferred out to an output printer 28 or an output punch 30 by way of the control unit 26.

The data processing system illustrated in FIGURE 1 is assumed to be a programmed data processing system which is capable of performing certain data processing functions in accordance with internally stored instructions, or program control orders, with the instructions being performed in a predetermined sequence as directed by the controls within the central processor.

In a copending application of Henry W. Schrimpf entitled "Information Handling Apparatus," filed August 11, 1958, and bearing Serial Number 754,253, now Patent No. 3,029,414, there is disclosed control circuitry for a central processor which is adapted to have a plurality of separate programs operating within the central processor on a sequentially time-shared basis. The central processor, as described in the Schrimpf application, may be one which is adapted to communicate with external peripheral devices such as the card reader 24, the printer 28, or the punch 30, and also with the magnetic tape units 16, 18, 20 or 22, on an appropriate time-shared basis. In addition, programs within the central processor may be carried on at the same time on a time-shared basis. Thus, for example, an instruction within the central processor may call for a card to be read by the card reader 24, and the data to be moved from the card reader into the central processor main memory. After the card data has been read in, it may be appropriately manipulated by an internally stored program and then read out to one of the tape units, for example, tape unit 16. The data may be subsequently called back from the tape unit by way of the tape control circuit 14, to the central processor, at which point it may be further manipulated and then transferred out through the control unit 26 to the printer 28 or the punch 30. The manipulations which may be performed may be arithmetic or editing manipulations of the type well known in the data processing art. It will be apparent that the actual arrangement of the peripheral devices with respect to the central processor may be of various types, with that illustrated in FIGURE 1 being but one example.

The efficient controlling of the central processor with respect to peripheral devices, as well as with respect to programs that are being performed within the central processor, is of utmost importance to a user. Efficiency and programming use can be effected by appropriate time-sharing in the central processor, and the abovementioned Schrimpf application is representative of one way in which such efficient time-sharing may be achieved.

Figure 2:
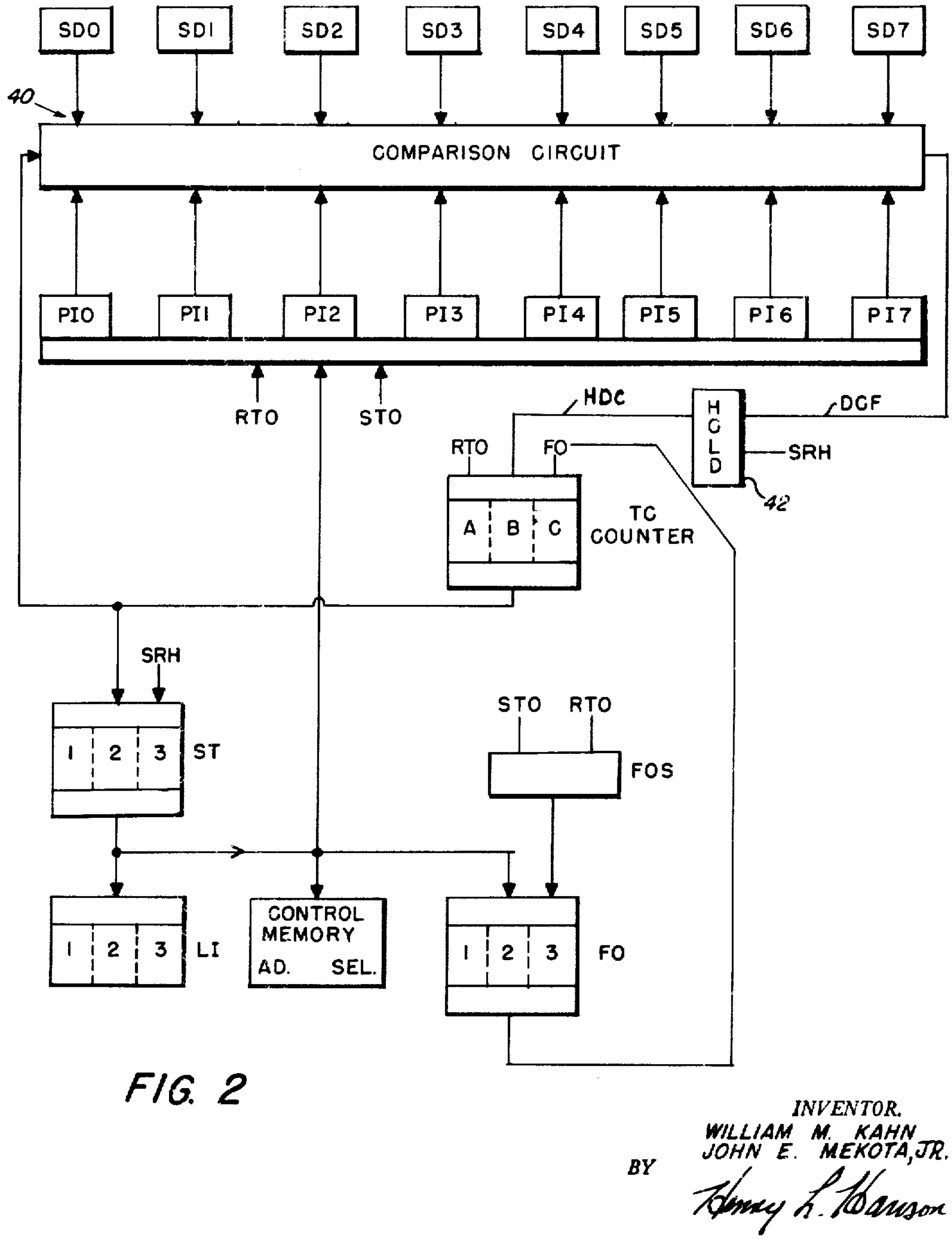
FIGURE 2 illustrates diagrammatically the arrangement of a portion of the control circuits utilized in the present invention.
Figure 3:
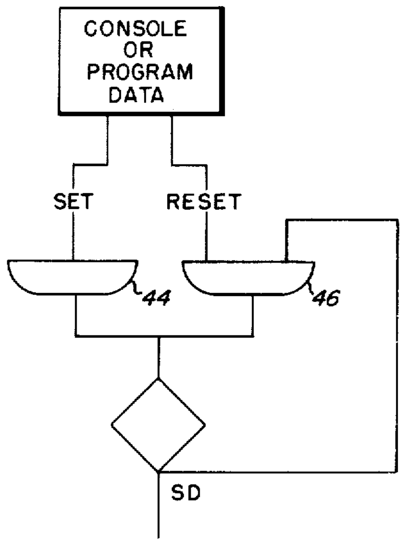
FIGURE 3 illustrates a logical circuit for indicating a program demand condition.
Figure 4:
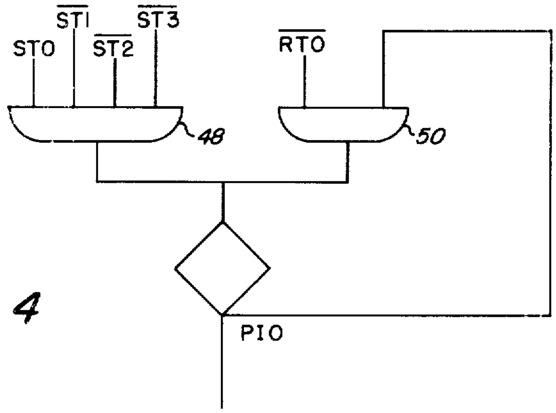
FIGURE 4 illustrates a logical circuit for storing a temporary off condition.

The time-sharing achieved in the present invention is illustrated diagrammatically by the circuitry shown in FIGURE 2. Referring specifically to FIGURE 2, the circuit will be seen to include a plurality of program demand or sequence register demand signal sources SD0 SD7. The details of the SD circuit are illustrated in FIGURE 3 and are discussed in detail below. Also provided in the circuitry of FIGURE 2 are the "programmed interlocked" storage circuits PI0–PI7. The details of this type of storage circuit are illustrated in FIGURE 4 and will be discussed in detail below. The sequencing is under control of a traffic control counter TC, the output of which is adapted to be applied to a comparison circuit 40, which has as inputs thereto the programmed interlock storage circuits PI0–PI7 and the sequence demand sources SD0–SD7. The output of the comparison circuit 40 is fed into a hold circuit 42, which is adapted to provide a signal, HDC, to the traffic control counter TC to lock the counter in a particular counter setting when a comparison has been made by the circuits 40.

Figure 9:
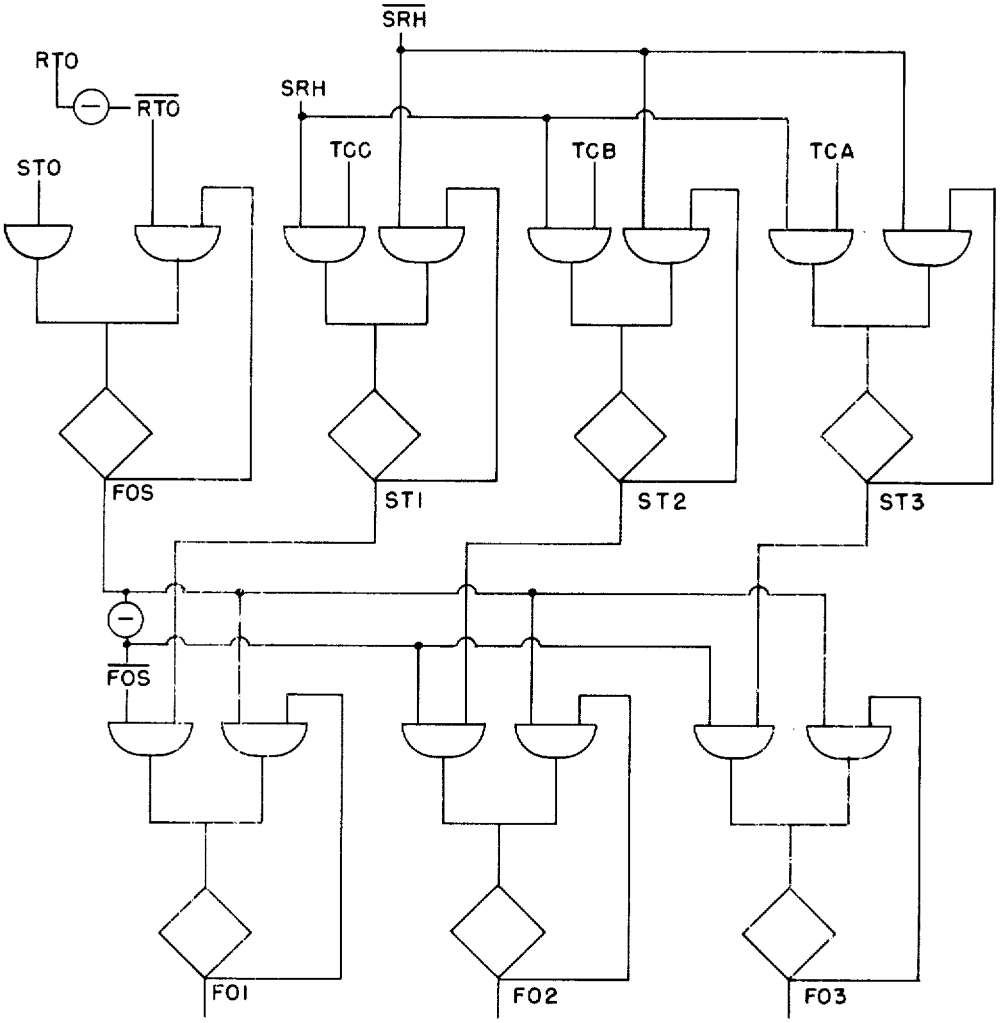
FIGURE 9 illustrates a pair of storage registers associated with the control operation of the present invention.

The outputs of the traffic control counter TC also communicate with a secondary storage circuit ST. The ST storage circuits may be as indicated in FIGURE 9 and will be discussed in detail below. The secondary storage circuit ST communicates with a further pair of storage registers, the first being a storage register LI, and the second being a storage register designated as the first off register FO. The secondary storage register ST also communicates with a control memory address selector such as is illustrated in the abovementioned Schrimpf application. The setting of the first off register FO will be under the control of a first off set circuit FOS, the latter including as inputs a store temporary off signal STO, and a reset temporary off signal RTO.

Before considering the operation of the circuitry illustrated in FIGURE 2, reference should be made to the other figures for a detailed analysis of the logical circuitry for implementing the individual diagrammatic circuits illustrated in FIGURE 2.

In FIGURES 3 through 10, certain logical circuit representations have been illustrated for purposes of demonstrating a preferred form of implementation for the present invention. The actual circuit components utilized within the logical circuitry will, of course, depend upon operating speeds required of the over-all system, as well as cost and other factors. Representative circuit implementation, insofar as hardware is concerned, may be in accordance with the teachings of an article by Norman S. Zimbel entitled "Package Logical Circuitry for a 4mc Computer," printed in Part 4 of the Convention Record of the I.R.E., 1954. Certain of the logical circuits illustrated in each of FIGURES 3 through 10 are connected to form dynamic flip-flops wherein a set condition in the flip-flop is a condition wherein the circuit is in a state of controlled oscillation. The reset condition is a condition wherein a controlled oscillation is shut off. When reset, a negation output line on the circuit will be active.

Referring specifically to FIGURE 3, there is illustrated a circuit for implementing and storing a signal or sequence demand signal. The circuit will be seen to comprise a pair of gating circuits 44 and 46. The gating circuit 44 is indicated as the set gate, while the gate 46 is indicated as the reset gate. Such signals for the circuit may be derived from data originating at the control console or from a program being performed within the system. The set data will be effective to pass through the gate 44 to the output thereof and then to be fed back to the input of the gate 46. The feedback signal will recirculate through the gate 46 by way of the feedback line until such time as the reset gate is closed by further signals, either derived from the console or from a program control order. As long as the signal is recirculating within the dynamic flip-flop, the output thereof is considered to be active. In the event that the flip-flop is reset, the assertion output thereof is assumed to be inactive.

Referring next to FIGURE 4, the programmed interlock storage circuit PI0 is illustrated as a dynamic flip-flop having an input set gate 48 and a reset gate 50. The signals required to set a particular programmed interlocked flip-flop, such as the one illustrated in FIGURE 4, are signals representing or identifying the particular setting of the secondary storage circuit ST, which is directly related to a particular one of a plurality of programs in demand by way of the sequence demand circuits SD. The signal STO is a signal especially derived to indicate that the program order which has come up for performance has called for an operation that cannot be performed because a device which it requires for performance is busy. The STO signal will then provide for the setting of the flip-flop which remains set by way of a recirculation path through the gate 50. The gate 50 will remain open until such time as the signal RTO becomes active and the gate 50 is closed. Each of the programmed interlock storage circuits PI0 through PI7 is implemented in substantially the same manner as that illustrated in FIGURE 4 with the exception that the code signals on the input gate 48 will correspond to the binary coding representing the particular program which has encountered a busy condition.

Figure 5:
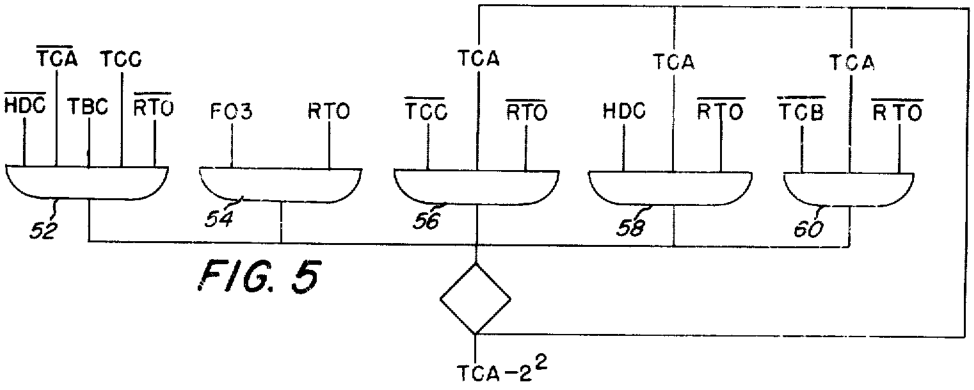
FIGURES 5, 6 and 7 illustrate the logical circuitry for the traffic control counter stages used in the present invention.
Figure 6:
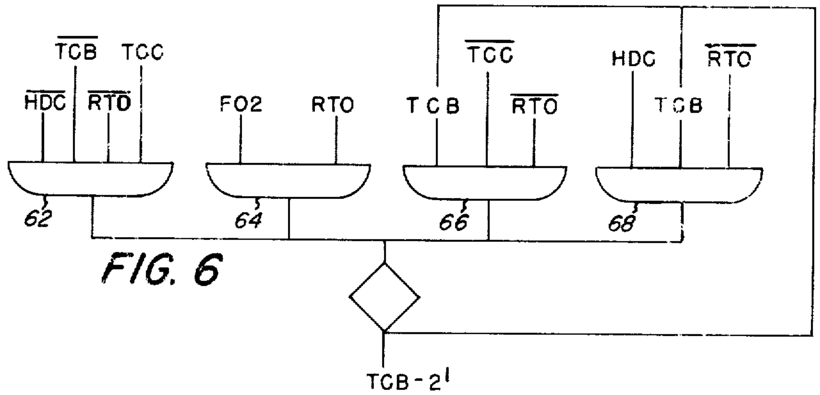
Figure 7:
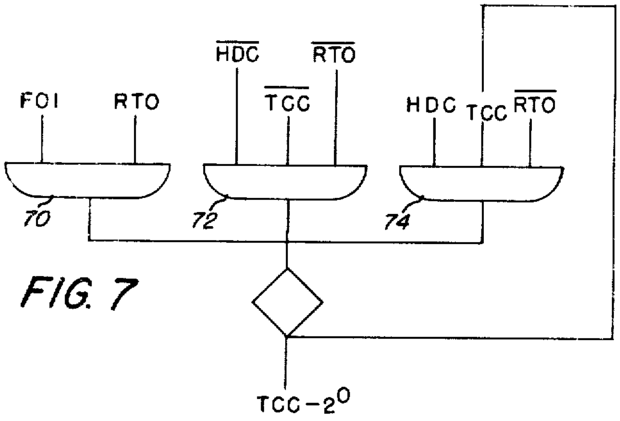

Referring next to FIGURES 5, 6 and 7, there are here illustrated the three separate stages of the traffic control counter TC. The traffic control stage TCA is the high-order stage of the three stages, and will be seen to comprise two input set gates 52 and 54, and three recirculation gates 56, 58 and 60. The gates 52, 56 and 60 are associated with the circuit functioning in a counting function with the counter stages TCB and TCC of FIGURES 6 and 7. The gate 54 is associated with a resetting function for the stage TCA when it is desired to establish a predetermined count within a state in combination with a setting of each of the other three stages by way of the first off storage circuits FO. The gating circuit 58 is a recirculation gate used for purposes of holding the setting of the counter stage for a predetermined time.

The counter stage TCB, shown in FIGURE 6, is basically similar to that of the above discussed timer stage, with the exception that one less gate is required in order to implement the counting logic. In this particular circuit, the logical circuit includes four gating circuits 62, 64, 66 and 68. In this instance, the gating circuits 62 and 66 are used for implementing the counting function, the gating circuit 64 is used for resetting the counter stage to a predetermined condition, and the gating circuit 68 is concerned with the recirculation of a particular setting of the stage and the holding of the setting of that stage for a predetermined time. FIGURE 7 illustrates the third stage of the counter. This stage includes three gating circuits 70, 72 and 74. The gate 72 is used to implement the counting in the stage TCC, while gating circuit 70 is used for resetting the stage to a predetermined count, as determined by the related stage in the first off storage circuit FO1. The gating circuit 74 is a recirculation gate used for holding the setting of this stage of the counter.

The counter stages TCA, TCB and TCC, when counting, operate as an eight-state binary counter. The counting is in a binary sequence.

Figure 8:
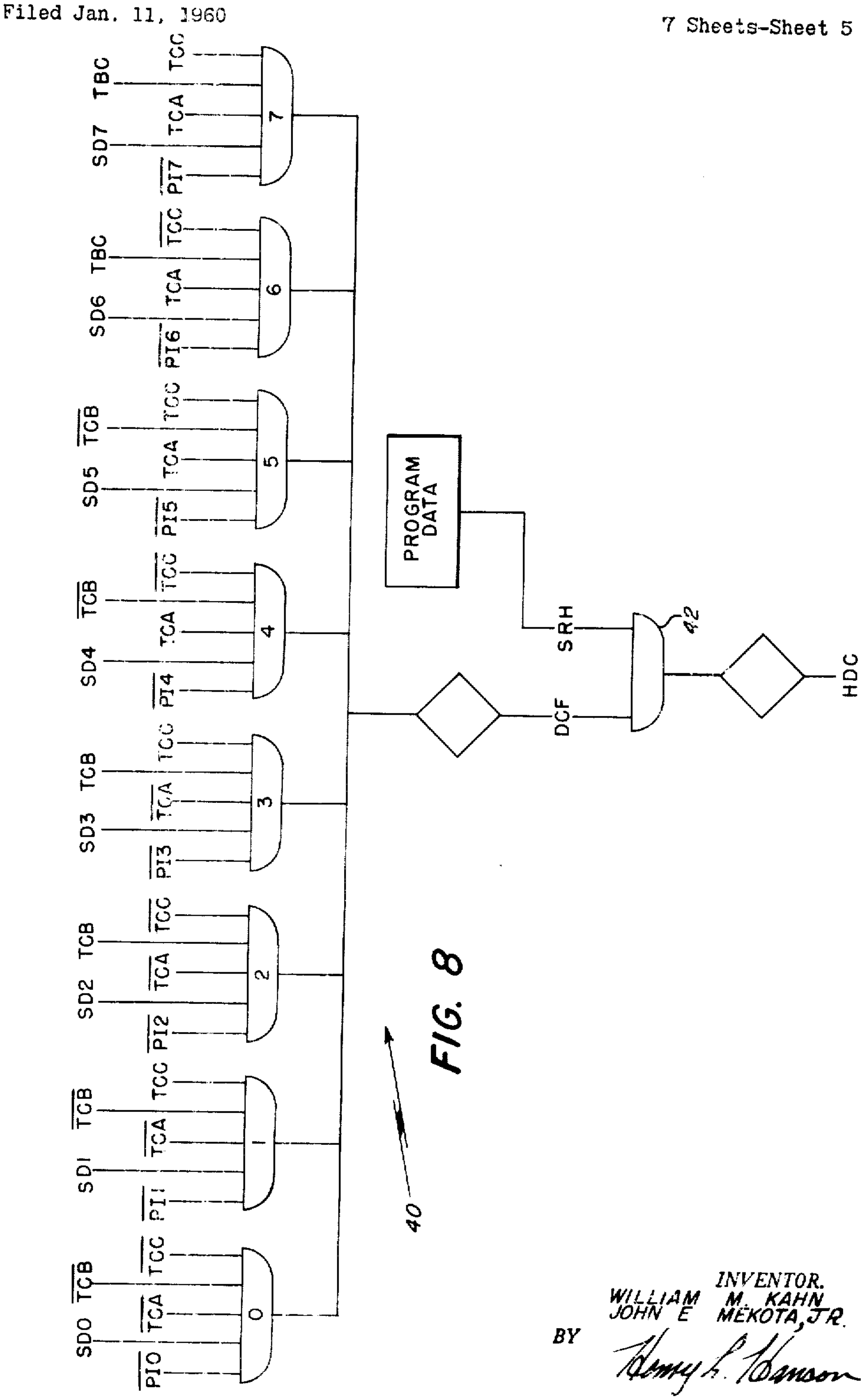
FIGURE 8 illustrates a form of comparison circuit.

The comparison circuitry 40 illustrated in FIGURE 8 will be seen to comprise eight input gating functions, all buffered together. The input logic to each of the gating sections is unique to defining the sequence register demand line SD, which is active. If, for example, the traffic control counter stages TCA, TCB and TCC are all set to zero, and if the sequence demand line, SD0, is active and the program interlocked signal PI0 is not active, the signal will be passed through the gate O to the output to produce the output signal DCF. The passing of the DCF signal to the output will then be gated against the sequence register hunt signal SRH which is derived from program data and is applied to the gating circuit 42. The output from the gate 42 is the hold signal HDC which is applied to the counter traffic control stages of FIGURES 5, 6 and 7. It will be seen, by noting the logical function from each of the gating circuits, that with a sequential binary count occuring at the counter stages TCA, TCB and TCC, the sequence demand lines will be examined in sequence. Once an active demand line is sensed, the counter stages TC will be stopped by a hold signal and will remain in that condition until they are released for further sequencing.

The storage circuits restoring the output of the traffic control counter are illustrated in FIGURE 9. As illustrated in FIGURE 9, there are three storage dynamic flip-flops ST1, ST2 and ST3. When there is a sequence register hunt signal SRH indicated on the inputs of these ST1–ST3 circuits, the setting of the traffic control counter stages will be applied to the ST circuits and they will store this data by way of the respective recirculation gates when the hunt signal is turned off and the negation signal $\overline{SRH}$ becomes active.

Also associated with the output of the storage circuits ST are the first off storage circuits FO, which are also illustrated as dynamic flip-flops with each stage having an input set gate and a reset or recirculation gate. The setting of the first off storage circuits FO is controlled by a further first off storage circuit FOS, which likewise takes the form of a dynamic flip-flop having an input set gate and a reset or recirculation gate. The control signals for the setting in the FOS flip-flop are derived from the circuitry illustrated in FIGURE 10. Operationally, the circuit of FIGURE 9, upon receiving a signal calling for setting of the temporary off condition by way of the signal STO, will be effective to open the set input set gates for each of the flip-flops F01, FO2 and FO3. With these set gates open, and with predetermined signal combinations stored in the ST flops, the counting data signal will be dropped into the first off flops FO for storage until they are subsequently utilized within the circuit.

Figure 10:
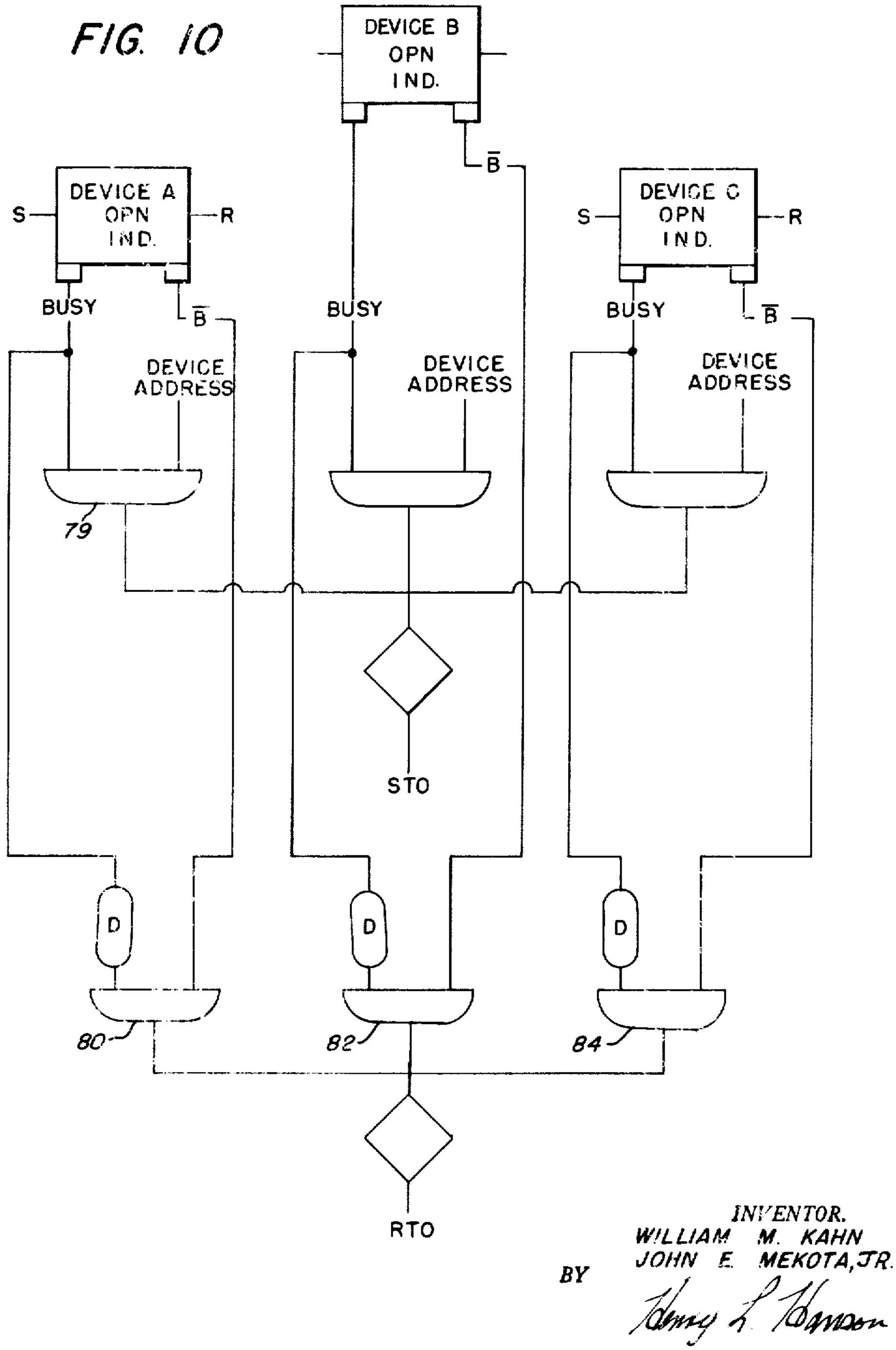
FIGURE 10 illustrates logical circuitry for providing certain of the control signals used with the present invention.

Referring to FIGURE 10, logical circuitry for creating the STO and RTO signals is illustrated. In a normal data processing system, there will be a number of different devices that can be utilized by the central processor when such a device has been appropriately addressed by an instruction or program control order. Once an operation has been initiated by an instruction, the instructing mechanism may be released and the device called into operation will continue in operation until it has completed performing the job it was instructed to do. Only three such devices have been referred to in FIGURE 10 and they are Device A, Device B and Device C, each of which has the operational indicator (illustrated) associated therewith which may take the form of a flip-flop having both a set input and a reset input for purposes of activating the output to create a busy signal B when the flip-flop has been set and a $\overline{B}$ signal when the circuit has been reset. Each individual device operation indicator has a gating circuit for passing its busy signal to the output of the circuit to produce the STO signal when the associated device has been addressed by way of a program control order or instruction. The set temporary off signal STO is adapted to be applied to the input set gate of the FOS circuit in FIGURE 9. The signal is also applied to the program interlocked circuits PI, as illustrated in FIGURE 4.

As soon as a busy condition has been removed from a particular device, a reset signal will be applied to the operation-indicating flip-flop, and the busy output will become inactive and the negation output $\overline{B}$ will become active. This signal $\overline{B}$, when combined with the delayed output of the busy signal, is applied to a further set of gates 80, 82 and 84, depending upon which one of the particular devices has been switched from a busy state to a non-busy state. The three gating circuits 80, 82 and 84 are buffered together and any one of the three gates is capable of producing the reset temporary off signal RTO which is utilized in the program interlock circuits PI of FIGURE 4, the counter stages of FIGURES 5 through 7, and the first-off circuits FO of FIGURE 9.

The operation of the over-all control circuit which embodies the present invention will be understood by making further reference to FIGURE 2, which is a composite diagrammatic showing of the major portions of the invention essential to effect the desired functioning thereof. In considering the operation, it is assumed that the over-all data processing system is in a processing operation and that the sequence demand signal lines SD0 SD1 and SD6 are active, having been set in a manner such as described above in connection with FIGURE 3.

With a sequence register hunt signal SRH present on the hold circuit 42, and in the absence of a DCF signal from the comparison circuit 40, the traffic control counter TC will step through a progressive binary sequence until such time as there is a comparison made in the comparison circuits 40. With the SD0 line active, the first comparison to be made will be a comparison with the SD0 line by way of the "zero" gate illustrated in FIGURE 8. This assumes that the temporary off signal circuit PI0 is in the inactive state. The signal passing through the zero signal gate of the comparison circuit 40 will produce the DCF signal which is coupled by way of the zero gate 42 to the output to create the signal HDC. The HDC signal is applied to the counter stages illustrated in FIGURES 5, 6 and 7, and the counters will be locked in their then current condition which indicates that a comparison has been made. When the counter is locked, the secondary storage circuits ST will be set to correspond to the setting of the counter at the next activation of the sequence register hunt signal SRH.

The signals within the secondary storage counter are then usable in the control memory address selector of the data processor to select a program control order or instruction. As soon as the order calling for the selection of the signal line SD0 has been released, the sequence register hunt signal SRH will come back on. The traffic control will then begin to count and will count until a shift is made to a further active sequence demand signal line. The next hit is on the active line SD1. When it is made, the operation will follow the pattern described above in connection with the hit on SD0, with the traffic control counter TC being locked up and the data in the counter being transferred to the secondary storage circuit ST and then to the control memory address selection circuitry.

As soon as the order in process is released and SRH activated, the counter circuit then scans to pick up a further active sequence demand line which is assumed to be the line SD6. The speed at which the counter operates is such that five digit periods are spent between the point of release from the demand line SD1 until a hit is made on the active demand line SD6. Note that the state of ST is immediately set from the traffic control counter TC, so that in only one digit period the new interval between successive sequence register hunt signals SRH be at least eight digit periods, in the worst case. With a hit on the demand line SD6, the above described procedure will be carried out with the counter being locked in position with the previous contents thereof having been transferred out to the control memory address selector by way of the secondary storage circuit ST.

The scanning process will then repeat with the circuit stepping back to the active demand line SD0, the demand line SD1, and then the demand line SD6, in that order. If a further demand line should become active, such as the demand line SD3, this demand line will be picked up in sequence in the next cycle of the scanning operation. As soon as the order associated therewith has been completed, the apparatus then steps onto select a further demand line.

Up to this point in the discussion of the operation, no mention has been made of a situation where a control order called into operation involves a peripheral device where the performance time of the order called out will be longer than the normal cycle time of the central processor. In the case of a tape unit and the associated tape control unit associated with the central processor, the circuits may be arranged to provide some type of intermediate or buffer storage between the tape unit and the central processor. In the event that a common buffer is used for several of the tape units, it is possible that following selected instructions, a particular tape unit will be using a buffer within the tape control unit for a particular reading or writing operation as directed by the instruction from the central processor. Whenever that buffer unit or the tape unit is busy such that either is not available for use by another instruction, the system must provide the necessary indication of this fact and further provide for remembering what program was the first to call for this particular device which is busy. In considering the mode of operation under this set of conditions, it is assumed first that in the program initiated by sequence demand line SD1, the instruction first called out requires the operation of an external peripheral device, such as Device A in FIGURE 10. When Device A is in a busy state, the operation indicator will be switched to the set condition. In the event that a further programmed instruction is called out which directs the use of this Device A prior to the time that the busy condition is removed, this will be sensed by way of the gating circuitry illustrated in FIGURE 10, wherein the Device A address and the busy signal will be passed through the gate 79 to produce the set temporary off signal STO. When the STO signal of FIGURE 10 becomes active, the signals stored in the secondary index storage circuits ST (in this case binary 1) will be dropped into the first off storage circuits FO, as illustrated in FIGURE 9. At the same time, the program interlock circuit PI1 will be set. The circuit will then be released for a further hunting for an active demand line, and the sequencing by way of the traffic control counter will continue except that the demand line associated with the program interlock line PI1, that is active, is bypassed by the inhibiting action of $\overline{\text{PI1}}$ on gate 2 of the demand comparison circuit in FIGURE 8. As soon as the Device A has been released upon the completion of the instruction that was initially activating the device, the reset temporary off signal RTO will be created by way of the gating signals on the input of the gate 80. When the reset temporary off signal RTO is provided, the first off data in the circuit will be transferred into the traffic control counter TC by way of the respective gates 54, 64 and 70. The number which has been stored within the first off circuits FO resets the counter circuits TC to the desired setting so that the next program called into operation will be the one which was first turned off under a busy condition. This ensures that no one particular program can take over and effectively swamp out other programs. Further, this mode of operation ensures that the apparatus is not held up on the performance of any particular instruction that is not requiring the need of a device which is busy. The resultant balancing of the use of the system achieves a degree of efficiency which has heretofore been impossible to attain.

It will be noted in FIGURE 10 that when any one device is removed from the busy condition, the reset temporary off signal RTO is produced. The effect of this is to remove all of the temporary off conditions stored in the PI circuits, and also to reset the traffic control counter TC to the first off indicator. In the event that the device which was busy was released is not the one which the first off circuit is calling for, the apparatus will go through the procedure as though a regular busy condition was sensed and the first off condition will again be dropped into the FO circuit. The result of this is that there is a periodic inspection made of all of the temporary off conditions each time any device is removed from a busy condition. This periodic checking each time a device is removed from a busy condition is not objectionable for the reason that it takes but a single cycle time in order to make an inspection of each of the active demand lines for a busy condition and once the inspection has been completed for all of the demand lines, the apparatus will assume its normal operation until such time as the desired busy condition associated with the control order identified by the data in the circuit FO has been released.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure by Letters Patent is:

1. In apparatus for use with a multi-programmed data processing system, the combination comprising a plurality of independent program demand signal lines each of which may become active independently of any of the other signal lines, a program selection counter having a plurality of counting stages less in number than the number of said plurality of program demand signal lines, a plurality of gating means connected to said program selection counter and to said signal lines to stop said counter when an active signal line is sensed, and means connected to the output of said gating means to transfer the setting of said counter when stopped to an output selection register to select the next step in one of a plurality of independent programs being performed.

2. In apparatus for use with a multi-programmed data processing system, the combination comprising a plurality of independent program demand signal lines, each of which may become active independently of any of the other signal lines, a program selection counter, a plurality of gating means connected to said program selection counter and to said signal lines to stop said counter when an active signal line is sensed, and means connected to the output of said gating means to transfer the setting of said counter when stopped to an output selection register to select the next step in a program related to the setting of said counter.

3. In apparatus for use with a multi-programmed data processing system, the combination comprising a plurality of independent program demand signal lines, each of which is adapted to be active independently of any of the other signal lines when an associated program is to be performed, a program selection counter, a plurality of demand signal line off indicating means, gating means connected to said program selection counter, to said indicating means, and to said signal lines so that said counter may be stopped when an active signal line is sensed, and means connected to the output of said gating means to transfer the setting of said counter when stopped to an output selection register to select an address for a program to be performed.

4. A data processing system controller comprising a plurality of signal demand lines, each of which is adapted to become active independently of any of the others, indicating means connected to said signal demand lines to switch selected ones of said lines to an inactive state, a counter, means including said counter connected to sense in sequence those demand lines which are active, means connected to said counter to store the setting of said counter when said counter has selected an active demand line, and storage means connected to said counter and to said indicating means to store the setting of said counter when said indicating means switches one of said demand lines to an inactive state.

5. A data processing system controller comprising a plurality of signal demand lines, each of which is adapted to become active independently of any of the others, indicating means connected to said signal demand lines to switch selected ones of said lines to an inactive state, a counter, means including said counter connected to sense in sequence those demand lines which are active, means connected to said counter to store the setting of said counter when said counter has sensed an active demand line, storage means connected to said counter and to said indicating means to store the setting of said counter when said indicating means switches one of said demand lines to an inactive state, and means connecting said storage means to said counter to reset said counter to correspond with the data stored in said storage means.

6. A data processing system controller comprising a plurality of signal demand lines, each of which is adapted to become active independently of any of the others, indicating means connected to said signal demand lines to switch selected ones of said lines to an inactive state, a counter, means including said counter connected to sense in sequence those demand lines which are active, counter control means connected to said counter to stop said counter from counting when an active demand line is sensed, means connected to said counter to store the setting of said counter when said counter has been stopped, and storage means connected to said counter and to said indicating means to store the setting of said counter when said indicating means switches one of said demand lines to an inactive state.

7. A data processing apparatus comprising a plurality of sequence demand lines, each of which is adapted to be active independently of the others when a program related to each demand line which becomes active is to be performed, control means for producing a signal indicating a busy condition in apparatus associated with a particular program, a demand line scanner, comparison means connected to said demand lines, to said control means, and to said demand line scanner to sense when said scanner detects an active demand line and said control means is not indicating a busy condition, scanner data storage means, and transfer means connected between said scanner and said scanner data storage means to effect a storage of the scanner data when an active demand line is sensed.

8. A data processing apparatus comprising a plurality of independent sequence demand lines, each of which is adapted to be active independently of any of the others when a program related to each demand line which becomes active is to be performed, control means for producing a signal indicating a busy condition, a demand line scanner, comparison means connected to said demand lines, to said control means, and to said demand line scanner to sense when said scanner detects an active demand line and said control means is not indicating a busy condition, a first scanner data storage means, transfer means connected between said scanner and said scanner data storage means to effect a storage of the scanner data when an active demand line is sensed, a second scanner data storage means, and means connected to said control means and to said scanner to store the data from said scanner in said second storage means when a busy condition has been indicated.

9. A data processing apparatus comprising a plurality of independent sequence demand lines, each of which is adapted to be active independently of any of the others when a program related to each demand line which becomes active is to be performed, control means for producing a signal indicating a busy condition, a demand line scanner, comparison means connected to said demand lines, to said control means, and to said demand line scanner to sense when said scanner detects an active demand line and said control means is not indicating a busy condition, a first scanner data storage means, transfer means connected between said scanner and said scanner data storage means to effect a storage of the scanner data when an active demand line is sensed, a second scanner data storage means, means connected to said control means and to said scanner to store the data from said scanner in said second storage means when a busy condition has been indicated, and means connected between said second data storage means and said scanner to reset said scanner to the data stored in said second storage means when the busy condition has been removed.

10. Apparatus for controlling a data processing system comprising a plurality of independent program sequence demand lines, each of which is adapted to be active independently of any of the other demand lines whenever a program associated therewith is to be performed, a plurality of temporary-off-storage circuits associated one each with each of said plurality of demand lines, a sequential scanner connected to said demand lines and to said temporary-off-storage circuits, comparison means connected to be controlled by said scanner to produce in sequence an output for each active demand line which does not have the associated temporary-off-storage circuit active, indicating means connected to switch any one of said temporary-off circuits to an active state when a circuit-busy condition is present, and means including said indicating means connected to switch all of said temporary-off circuits to an inactive state when a circuit-busy condition is removed.

11. Apparatus for controlling a data processing system comprising a plurality of independent program sequence demand lines, each adapted of which is to be active independently of any of the other demand lines whenever a program associated therewith is to be performed, a plurality of temporary-off-storage circuits associated one each with each of said plurality of demand lines, a sequential scanner connected to said demand lines and to said temporary-off-storage circuits, comparison means connected to be controlled by said scanner to produce in sequence an output for each active demand line which does not have the associated temporary-off-storage circuit active, indicating means connected to switch any one of said temporary-off circuits to an active state when a circuit-busy condition is present, storage means connected to said scanner to store the data in said scanner when said indicating means is operative to sense a circuit-busy condition, means including said indicating means connected to switch all of said temporary-off circuits to an active state when a circuit-busy condition is removed, and means transferring the data from said storage means to said scanner when said circuit-busy condition is removed.

12. Apparatus for controlling a data processing system comprising a plurality of independent program sequence demand lines, each of which is adapted to be active independently of any of the other demand lines whenever a program associated therewith is to be performed, a plurality of temporary-off-storage circuits associated one each with each of said plurality of demand lines, a sequential scanner connected to said demand lines and to said temporary-off-storage circuits, comparison means connected to be controlled by said scanner to produce an output for each active demand line in sequence which does not have the associated temporary-off-storage circuit active, indicating means connected to switch any one of said temporary-off circuits to an active state when a circuit-busy condition is present, means including said indicating means connected to switch all of said temporary-off circuits to an active state when a circuit-busy condition is removed, and means connected to said scanner to initiate the scanning at a point related to the switching action of said indicating means.

13. A multi-programmed data processing system comprising a time-shared control unit, one or more data utilization devices or circuits having an operation time in excess of the normal program order performance time, means initiating operation of any one or more of said utilization devices or circuits in accordance with a first program control order, means sensing a second control order of like or different type calling for use of any one of said utilization devices or circuits prior to the completion of an operation initiated by said first control order, means storing signal representations indicative of said second control order, and means sensing the completion of the operation of said utilization devices or circuits and connected to said control unit to initiate the operation called for by said second control order.

14. A data processing system comprising a time-shared control unit, a control counter connected to sequence said control unit, a data utilization device or circuit having an operation time in excess of the performance time of selected control orders, means initiating operation of said utilization circuit in accordance with a first program control order, means sensing a second control order of like or other type calling for use of said utilization device or circuit prior to the completion of an operation initiated by a previous control order, means storing signal representations indicative of said second control order, and means sensing the completion of the operation of said utilization circuit and connected to said control unit to reset said control counter to select said second control order.

15. A multi-programmed data processing system comprising a time-shared control unit, a data utilization device or circuit adapted to be shared with more than one program and having an operation time in excess of the performance time of selected program control orders, means initiating operation of said uitlization device or circuit in accordance with a first program control order from a first program, means sensing a second control order of like type from a second program calling for use of said utilization circuit prior to the completion of an operation initiated by said first control order, means storing signal representations indicative of said second control order, and means sensing the completion of the operation of said utilization device or circuit and connected to said control unit to initiate the operation called for by said second control order.

References Cited by the Examiner

UNITED STATES PATENTS

| | | | |
|---|---|---|---|
| 2,797,862 | 7/57 | Andrews | 340—172.5 |
| 2,910,238 | 10/59 | Miles | 340—172.5 |
| 2,946,986 | 7/60 | Harrison | 340—172.5 |
| 2,959,351 | 11/60 | Hamilton | 340—172.5 X |
| 3,015,441 | 1/62 | Rent | 340—172.5 |

MALCOLM A. MORRISON, *Primary Examiner.*

IRVING L. SRAGOW, EVERETT R. REYNOLDS, ROBERT C. BAILEY, *Examiners.*